United States Patent
Lu et al.

(10) Patent No.: US 8,643,578 B2
(45) Date of Patent: Feb. 4, 2014

(54) METHOD OF DRIVING A DISPLAY PANEL AND DISPLAY APPARATUS HAVING THE DISPLAY PANEL

(75) Inventors: Jian Gang Lu, Suwon-si (KR); Hwa-Sung Woo, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1161 days.

(21) Appl. No.: 12/369,301

(22) Filed: Feb. 11, 2009

(65) Prior Publication Data

US 2009/0262106 A1      Oct. 22, 2009

(30) Foreign Application Priority Data

Apr. 22, 2008   (KR) .................................. 2008-37060

(51) Int. Cl.
   *G09G 3/36*   (2006.01)
(52) U.S. Cl.
   USPC ............... 345/87; 345/84; 345/204; 345/214; 349/33; 349/37
(58) Field of Classification Search
   USPC ........ 345/87, 214, 174–179, 84, 204; 349/33, 349/37
   See application file for complete search history.

(56) References Cited

U.S. PATENT DOCUMENTS

2006/0227273 A1* 10/2006 Shin et al. ..................... 349/139
2008/0074601 A1*  3/2008 Lee et al. ..................... 349/144

FOREIGN PATENT DOCUMENTS

| JP | 2003255911 A | 9/2003 |
| KR | 100280636 B1 | 11/2000 |
| KR | 100502102 B1 | 7/2005 |

* cited by examiner

*Primary Examiner* — Joe H Cheng
*Assistant Examiner* — Insa Sadio
(74) *Attorney, Agent, or Firm* — Cantor Colburn LLP (57) ABSTRACT

A method of driving a display apparatus having first and second data lines includes applying a first data signal (to which a first gamma curve has been applied) and a first inverted data signal (having a phase opposite to a phase of the first data signal) to the first data line and the second data line, respectively, during a first frame interval. The method further includes applying a second data signal (to which a second gamma curve has been applied) and a second inverted data signal (having a phase opposite to a phase of the second data signal) to the first data line and the second data line, respectively, during a second frame interval temporally subsequent to the first frame interval.

16 Claims, 7 Drawing Sheets

METHOD OF DRIVING A DISPLAY PANEL AND DISPLAY APPARATUS HAVING THE DISPLAY PANEL

This application claims priority to Korean Patent Application No. 2008-37060, filed on Apr. 22, 2008, and all the benefits accruing therefrom under 35 U.S.C. §119, the contents of which in its entirety are herein incorporated by reference.

BACKGROUND OF THE INVENTION

1. Field of the Invention

The present invention relates to a method of driving a display panel, and, more particularly, to a method of driving a display panel used in a liquid crystal display ("LCD"), and a display apparatus having the LCD.

2. Description of the Related Art

Generally, a liquid crystal display ("LCD") apparatus includes a lower substrate, an upper substrate and a liquid crystal layer interposed between the upper substrate and the lower substrate. In an LCD apparatus, an alignment of liquid crystal molecules in the liquid crystal layer is varied in response to a voltage difference between a common electrode of the upper substrate and a pixel electrode of the lower substrate. More specifically, an electric field is generated between the common electrode and the pixel electrode, based on the voltage difference. The alignment of the liquid crystal molecules varies according to the electric field, and a light transmittance through the liquid crystal layer is thereby controlled to display an image.

The liquid crystal molecules of the LCD apparatus are anisotropic. As a result, an image display quality of the LCD apparatus varies based on a viewing angle. Thus, a conventional LCD apparatus has a narrower viewing angle than other types of display apparatuses. To improve the viewing angle of the LCD apparatus, a super patterned vertical alignment ("SPVA") mode LCD apparatus and an electrically-induced optical compensation ("EOC") mode LCD apparatus have been developed.

In the SPVA mode LCD apparatus, a common electrode is formed on an upper substrate, and a pixel electrode is formed on a lower substrate. The common electrode and the pixel electrode are patterned to form multiple domains thereon. During operation, different voltages are applied to the patterned common electrode and the patterned pixel electrode. More specifically, different voltages are applied to the multiple domains of the common electrode and the pixel electrode to improve a viewing angle of an image displayed on the SPVA mode LCD apparatus.

The EOC mode LCD apparatus includes a first substrate and a second substrate. The first substrate includes two electrodes disposed substantially parallel to each other. The first substrate and the second substrate include vertical alignment layers formed thereon. A liquid crystal layer having positive dielectric anisotropy is interposed between the first substrate and the second substrate. When a voltage is applied to the two electrodes of the first substrate, an electric field is generated in a substantially horizontal direction between the first substrate and the second substrate. Liquid crystal molecules in the liquid crystal layer are aligned by the electric field to display an image on the EOC mode LCD apparatus.

To display the image, however, the EOC mode LCD apparatus requires a large cell gap (e.g., a thickness of the liquid crystal layer between the first substrate and the second substrate) relative to other LCD apparatuses. As a result, the EOC mode LCD apparatus has disadvantages such as lower light transmittance, lower response time and narrower viewing angle, for example, in comparison with other display apparatuses such as the SPVA mode LCD apparatus. Therefore, it is desired to develop an EOC mode LCD apparatus which overcomes the abovementioned disadvantages.

BRIEF SUMMARY OF THE INVENTION

Exemplary embodiments of the present invention provide a method of driving a display panel having an enhanced display quality.

Exemplary embodiments of the present invention further provide a display apparatus including the display panel having the enhanced display quality.

According to an exemplary embodiment of the present invention, a method of driving a display panel is provided. The display panel includes a first switching element connected to a first data line and a gate line, a second switching element connected to the gate line and a second data line adjacent to the first data line, and a liquid crystal capacitor connected to an output terminal of each of the first switching element and the second switching element. The method includes applying, during a first frame interval, a first data signal (to which a first gamma curve has been applied) to the first data line and a first inverted data signal (having a phase opposite to a phase of the first data signal) to the second data line. The method further includes applying, during a second frame interval, a second data signal (to which a second gamma curve has been applied) to the first data line and a second inverted data signal (having a phase opposite to a phase of the second data signal) to the second data line. The second frame interval follows, e.g., is temporally subsequent to, the first frame interval.

According to an alternative exemplary of the present invention, a display apparatus includes a display panel, a data driving part and a gate driving part. The display panel includes a first switching element connected to a first data line and a gate line, a second switching element connected to the gate line and a second data line adjacent to the first data line, and a liquid crystal capacitor connected to an output terminal of each of the first switching element and the second switching element. The data driving part applies a first data signal (to which a first gamma curve has been applied) and a first inverted data signal (having a phase opposite to a phase of the first data signal) to the first data line and the second data line, respectively, during a first frame interval. The data driving part applies a second data signal (to which a second gamma curve has been applied) and a second inverted data signal (having a phase opposite to a phase of the second data signal) to the first data line and the second data line, respectively, during a second frame interval temporally subsequent to the first frame interval. The gate driving part applies a gate signal to the gate line.

According to another alternative exemplary of the present invention, a display apparatus includes a display panel, a pixel, a data driving part and a gate driving part. The display panel includes a first switching element connected to a first data line and a gate line, a second switching element connected to the gate line and a second data line adjacent to the first data line, and a liquid crystal capacitor connected to an output terminal of each of the first switching element and the second switching element. The pixel is connected to the first data line and the second data line, and includes a first storage capacitor formed by a drain electrode of the first switching element, a storage line and an insulation layer disposed between the drain electrode of the first switching element and the storage line, and a second storage capacitor formed by a drain electrode of the second switching element, a the storage line and an insulation layer disposed between the drain electrode of the second switching element and the storage line. The data driving part applies a first data signal (to which a first gamma curve has been applied) and a first inverted data signal (having a phase opposite to a phase of the first data signal) to the first data line and the second data line, respectively, during a first half of one frame. The data driving part applies a second data signal (to which a second gamma curve has been applied) and a second inverted data signal (having a phase opposite to a phase of the second data signal) to the first data line and the second data line, respectively, during a second half of the one frame temporally subsequent to the first half of the one frame. The gate driving part applies a first gate pulse to the gate line during the first half of the one frame and a second gate pulse to the gate line during the second half of the one frame.

Thus, according to a method of driving a display panel and a display apparatus having the display panel according to exemplary embodiments of the present invention, a first data signal, having a dual polarity and to which a first gamma curve has been applied, is applied to a pixel during a first frame interval, e.g., during first ½ frame of one frame, and a second data signal, having a dual polarity and to which a second gamma curve has been applied, is applied to the pixel during a subsequent second ½ frame of the one frame. As a result, a side visibility of the display apparatus according to an exemplary embodiment is substantially enhanced.

BRIEF DESCRIPTION OF THE DRAWINGS

The above and other aspects, features and advantages of the present invention will become more readily apparent by describing in further detail example embodiments thereof with reference to the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1:
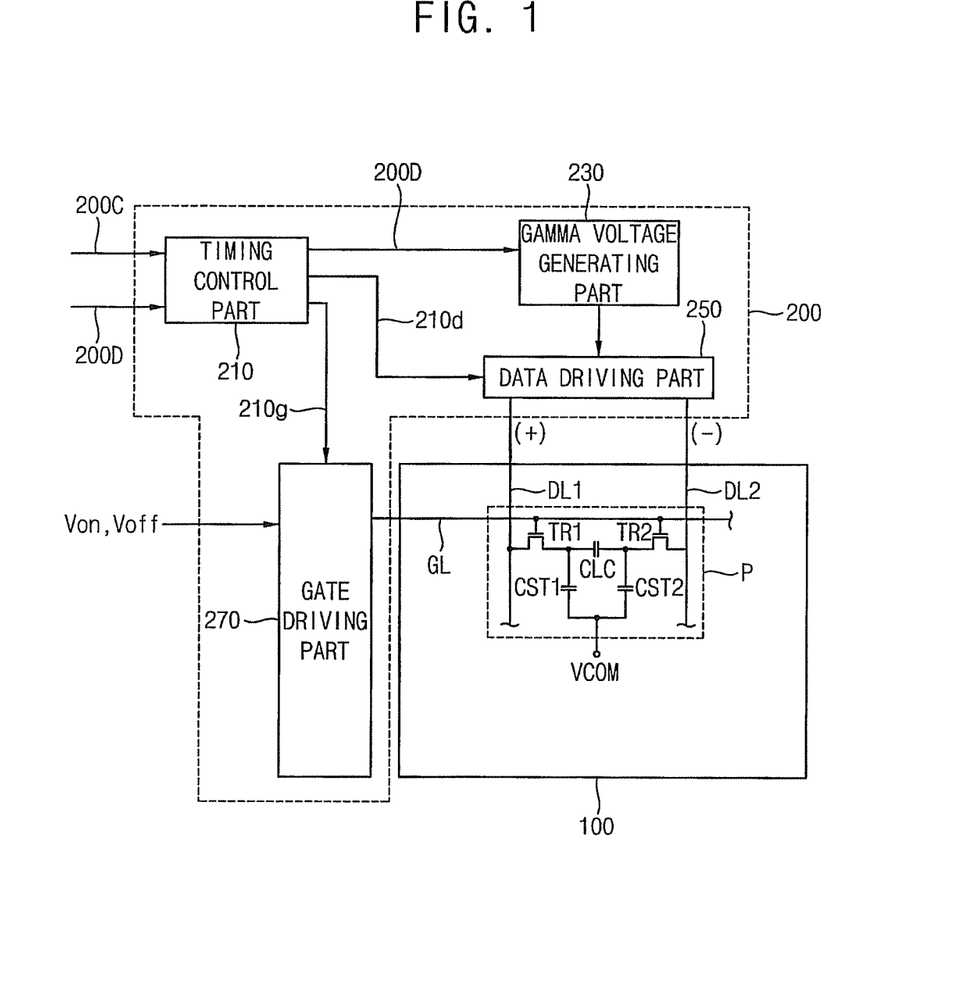
FIG. 1 is a block diagram of a display apparatus according to an exemplary embodiment of the present invention.
Figure 2:
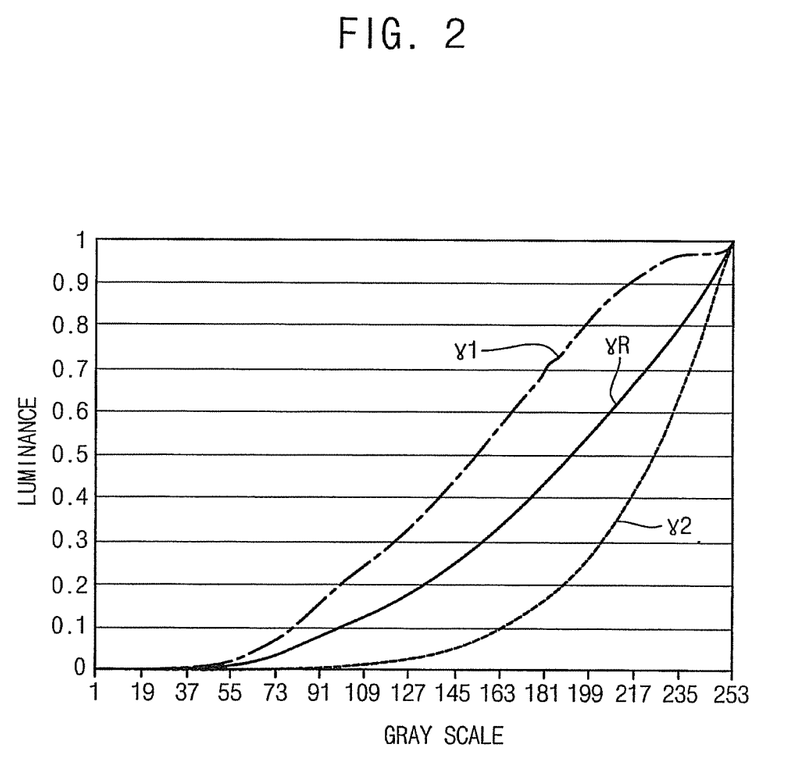
FIG. 2 is a graph of luminance versus gray scale level illustrating gamma curves of a driving apparatus of the display apparatus according to the exemplary embodiment of the present invention shown in FIG. 1.

FIG. 1 is a block diagram of a display apparatus according to an exemplary embodiment of the present invention. FIG. 2 is a graph of luminance versus gray scale level illustrating gamma curves of a driving apparatus of the display apparatus according to the exemplary embodiment of the present invention shown in FIG. 1.

Referring to FIGS. 1 and 2, a display apparatus according to an exemplary embodiment includes a display panel 100 and a driving apparatus 200 which drives the display panel 100.

The display panel 100 includes a plurality of pixels P. Each pixel P of the plurality of pixels P is driven by a data signal and a gate signal delivered via data lines and gate lines, respectively. Specifically, as shown in FIG. 1, two data lines, such as a first data line DL1 and a second data line DL2, as well as a gate line GL are shown for purposes of illustration, but alternative exemplary embodiment of the present invention are not limited thereto. Further, the pixel P includes a first switching element TR1, a second switching element TR2, a liquid crystal capacitor CLC, a first storage capacitor CST1 and a second storage capacitor CST2. The first switching element TR1 includes a control electrode (e.g., a gate electrode) connected to the gate line GL, an input electrode (e.g., a source electrode) connected to the first data line DL1, and an output electrode (e.g., a drain electrode) connected to a first terminal of the liquid crystal capacitor CLC. The second switching element TR2 includes a gate electrode connected to the gate line GL, a source electrode connected to the second data line DL2, and a drain electrode connected to a second terminal of the liquid crystal capacitor CLC. In an exemplary embodiment of the present invention, a common voltage VCOM is applied to the first storage capacitor CST1 and the second storage capacitor CST2, as shown in FIG. 1.

Data signals, and, more particularly, image data signals having dual polarity and corresponding to an image to be displayed on the pixel P, are applied to the first data line DL1 and the second data line DL2. For example, in an exemplary embodiment of the present invention, a positive polarity data signal (with respect to a reference voltage such as the common voltage VCOM, for example) is applied to the first data line DL1, and a negative polarity data signal (with respect to the reference voltage) is applied to the second data line DL2. Thus, positive and negative polarity voltages are applied to the pixel P, so that the liquid crystal capacitor CLC may be driven by a high voltage. Accordingly, the dual polarity driving method enhances a response time and a light transmittance of a liquid crystal display ("LCD") apparatus according to an exemplary embodiment of the present invention.

The driving apparatus 200 includes a timing control part 210, a gamma voltage generating part 230, a data driving part 250 and a gate driving part 270.

The timing control part 210 receives a control signal 200C and data 200D from an external device (not shown). The timing control part 210 generates a plurality of timing control signals, the received control signal 200C, which controls a driving timing of the data and gate driving parts 250 and 260. More specifically, a timing control signal corresponding to the data driving part 250 will be denoted as a data control signal 210d, and a timing control signal corresponding to the gate driving part 260 will be denoted as a gate control signal 210g. The timing control part 210 outputs the data control signal 210d and the gate control signal 210g to the data driving part 250 and the gate driving part 270, respectively. In addition, the timing control part 210 may provide the gamma voltage generating part 230 with the data 200D received from the external device, as shown in FIG. 1.

The gamma voltage generating part 230 converts the data 200D provided from the timing control part 210 into first gamma data and second gamma data. In an exemplary embodiment of the present invention, the first gamma data corresponds to a first gamma curve γ1 and the second gamma data corresponds to a second gamma curve γ2 (FIG. 2).

In FIG. 2, the x-axis represents a gray scale (e.g., of 256 available gray scale levels), and the y-axis represents a luminance (e.g., a light transmittance, in percent). A reference gamma curve γR is a gamma curve optimized for front visibility, while the first gamma curve γ1 and the second gamma curve γ2 are optimized for side visibility.

Based on the data 200D received from the timing control part 210, the gamma voltage generating part 230 generates the first gamma data (corresponding to the first gamma curve γ1) during a first frame interval, and generates the second gamma data (corresponding to the second gamma curve γ2) during a second frame interval. In an exemplary embodiment of the present invention, the first frame interval is an early ½ frame interval, e.g., a first half frame of one frame, and the second frame interval is a later ½ frame interval, e.g., a second half frame of the one frame subsequent to the first half frame thereof.

Referring again to FIG. 1, the data driving part 250 converts the first gamma data and the second gamma data generated by the gamma voltage generating part 230 into data voltages. In an exemplary embodiment of the present invention, the data voltages are analog signals. The data driving part 250 provides the first data line DL1 of the display panel 100 with a first data voltage of the data voltages. Further, the data driving part 250 provides the second data line DL2 of the display panel 100 with a first inverted data voltage having a phase opposite to a phase of the first data voltage applied to the first data line DL1. In an exemplary embodiment, for example, when the reference voltage is 0 V and the first data voltage applied to the first data line DL1 has a value of +5 V, the first inverted data voltage applied to the second data line DL2 has a value of −5 V.

Still referring to FIG. 1, the gate driving part 270 generates a gate pulse based on both the gate control signal 210g, provided from the timing control part 210, as well as a gate on voltage Von and a gate off voltage Voff provided from an external device (not shown). In an exemplary embodiment, the gate driving part 270 applies a gate pulse corresponding to the gate on voltage Von to the gate line GL during the first frame interval, and applies the gate pulse to the gate line GL to the gate line GL once again during the second frame interval. Thus, two gate pulses are applied to the gate line GL during one frame.

Figure 3:
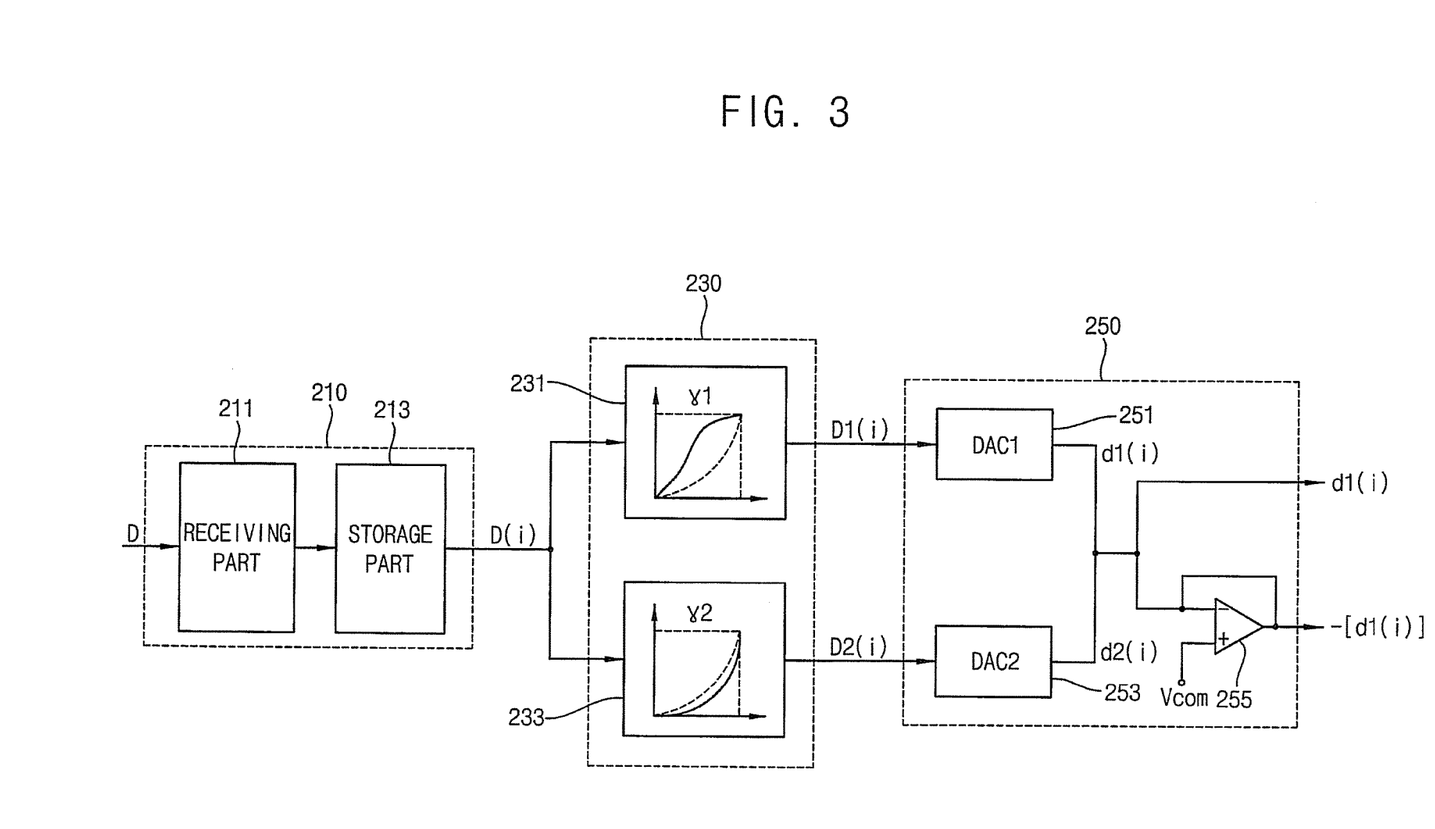
FIG. 3 is a block diagram of the driving apparatus of the display apparatus according to the exemplary embodiment of the present invention shown in FIG. 1.

FIG. 3 is a block diagram of the driving apparatus 200 of the display apparatus according to the exemplary embodiment of the present invention shown in FIG. 1.

Referring to FIGS. 1 and 3, the timing control part 210 of the driving apparatus 200 includes a receiving part 211 and a storage part 213. The receiving part 211 receives data D from an external device (not shown). The data D received by the receiving part 211 is stored in the storage part 213. In an exemplary embodiment, the storage part 213 may be, for example, a line memory which stores line data corresponding to a group of pixels P having pixels P thereof arranged in a horizontal direction on the display panel 100.

As shown in FIG. 3, the gamma voltage generating part 230 includes a first buffer 231 and a second buffer 233. The first buffer 231 stores first gamma data D1 to which the first gamma curve γ1 has been applied, and the second buffer 233 stores second gamma data D2 to which the second gamma curve γ2 has been applied. In an exemplary embodiment, the gamma voltage generating part 233 includes the first buffer 231 and the second buffer 233 which store the first gamma data D1 and the second gamma data D2, respectively, but alternative exemplary embodiments of the present invention are not limited thereto. For example, the gamma voltage generating part 233 according to an alternative exemplary embodiment may include a resistor string having resistance values which correspond to the first gamma curve γ1 and the second gamma curve γ2.

The gamma voltage generating part 230 converts the data D into the first gamma data D1 to which the first gamma curve γ1 has been applied during the first frame interval, and converts the data D into the second gamma data D2 to which the second gamma curve γ2 has been applied during the second frame interval. As described above in greater detail, in an exemplary embodiment of the present invention, the first frame interval is a first half frame of one frame, and the second frame interval is a second half frame of the one frame, but alternative exemplary embodiments of the present invention are not limited thereto. For example, in an alternative exemplary embodiment, the first frame interval may be a first full frame and the second frame interval may be a second full frame subsequent to the first full frame.

Still referring to FIG. 3, the data driving part 250 according to an exemplary embodiment includes a first digital-to-analog converter ("DAC") 251, a second DAC 253 and an inverting amplifier 255. The first DAC 251 converts the first gamma data D1 received from the first buffer 231 into a first data signal d1. In an exemplary embodiment of the present invention, the first data signal d1 is an analog type signal. The second DAC 253 converts the second gamma data D2 received from the second buffer 233 into a second data signal d2. In an exemplary embodiment of the present invention, the second data signal d2 is an analog type signal. The inverting amplifier 255 outputs a first inverted data signal −d1 (FIG. 3) and a second inverted data signal −d2 (best shown FIG. 7). The first inverted data signal −d1 has a phase opposite to a phase of the first data signal d1 applied from the first DAC 251. Likewise, the second inverted data signal −d2 has a phase opposite to a phase of the second data signal d2 applied from the second DAC 253.

In an exemplary embodiment of the present invention, the first data signal d1 outputted from the first DAC 251 is applied to the first data line DL1 (FIG. 1), and the first inverted data signal −d1 having an opposite phase to the first data signal d1 is applied to the second data line DL2 (FIG. 1) through the inverting amplifier 255.

In an exemplary embodiment, the inverting amplifier 255 is included in the data driving part 250, as shown in FIG. 3. Alternatively, the inverting amplifier 255 may be directly formed on a glass substrate of the display panel 100, e.g., may be disposed external to the data driving part 250.

Figure 4:
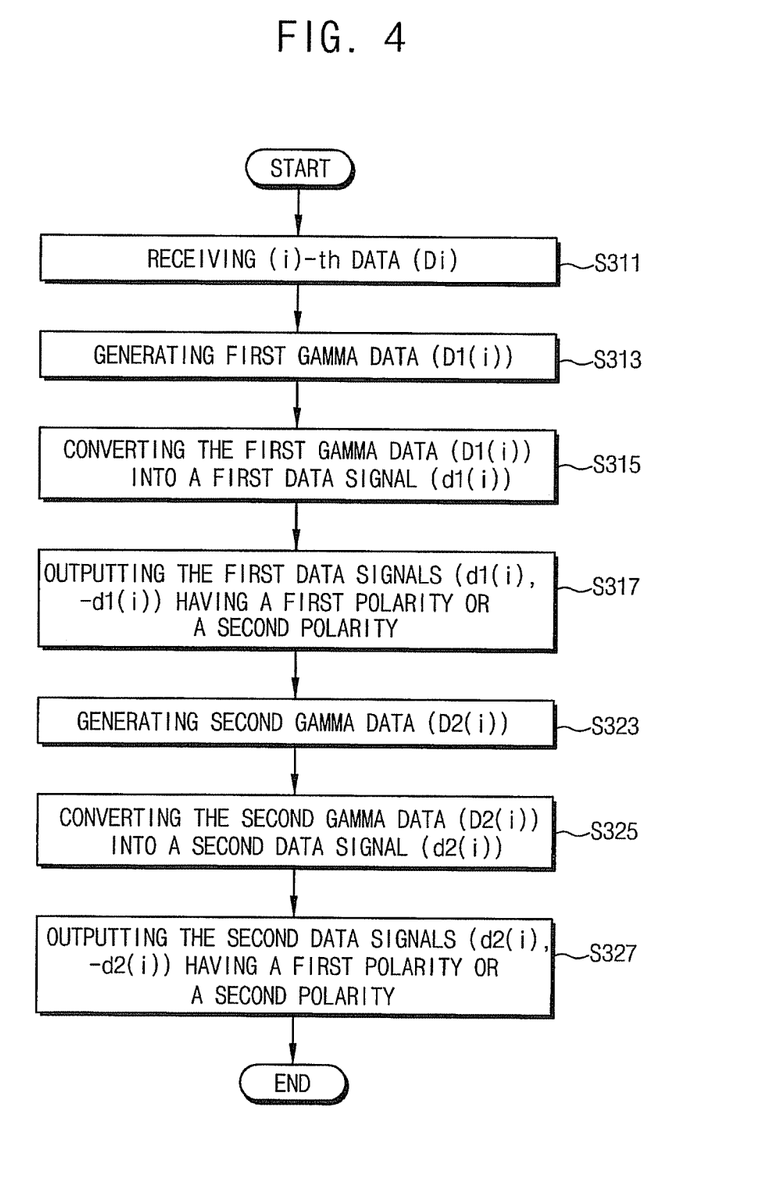
FIG. 4 is a flowchart illustrating steps of a method of driving the driving apparatus according to the exemplary embodiment of the present invention shown in FIG. 3.

FIG. 4 is a flowchart illustrating steps of a method of driving the driving apparatus according to the exemplary embodiment of the present invention shown in FIG. 3.

Referring to FIGS. 3 and 4, the receiving part 211 receives the data D, and the received data D is stored in the storage part 213. (i)-th data Di of the data D stored in the storage part 213 is delivered to the gamma voltage generating part 230 (step S311). In an exemplary embodiment of the present invention, the (i)-th data Di corresponds to the pixel P shown in FIG. 1.

In step S313, first gamma data D1($i$), to which the first gamma curve γ1 has been applied, is generated through the first buffer 231 based on the (i)-th data Di.

Then, the first gamma data D1($i$) is converted into a first data signal d1($i$) with the first DAC 251 (step S315). In an exemplary embodiment of the present invention, the first data signal d1($i$) is an analog signal.

The first data signal d1($i$) has a first polarity. The first data signal d1($i$) is converted into a first inverted data signal −d1($i$) having a second polarity by the inverting amplifier 255. The first data signal d1($i$) having the first polarity and the first inverted data signal −d1($i$) having the second polarity are then applied to the first data line DL1 and the second data line DL2, respectively, during a first frame interval (step S317). In an exemplary embodiment, the first frame interval is a first half frame of one frame.

Next, in step S323, second gamma data D2($i$), to which the second gamma curve γ2 has been applied, is generated with the second buffer 233 based on the (i)-th data Di.

The second gamma data D2($i$) is then converted into a second data signal d2($i$) with the second DAC 253 (step S325). In an exemplary embodiment of the present invention, the second data signal d2($i$) is an analog signal.

The second data signal d2($i$) has a first polarity. The second data signal d2($i$) is converted into a second inverted data signal −d2($i$) having a second polarity, opposite to the first polarity, by the inverting amplifier 255. The second data signal d2($i$) having the first polarity and the second inverted data signal −d2($i$) having the second polarity are then applied to the first data line DL1 and the second data line DL2 during a second frame interval (step S327). In an exemplary embodiment, the second frame interval is a second half frame of the one frame.

Thus, the first data signal d1($i$) to which the first gamma curve γ1 has been applied is applied to the pixel P (FIG. 1) during the first frame interval, and the second data signal d2($i$) to which the second gamma curve γ2 has been applied is applied to the pixel P during the second frame interval (temporally adjacent and subsequent to the first fame interval).

Therefore, as the pixel P of the display apparatus according to an exemplary embodiment is driven by the first data signal d1 and the second data signal d2, to which the first gamma curve γ1 and the second gamma curve γ2, respectively, have been applied a visibility, optimized for side visibility, as well as overall viewing angle characteristics of the display apparatus, are substantially enhanced.

Figure 5:
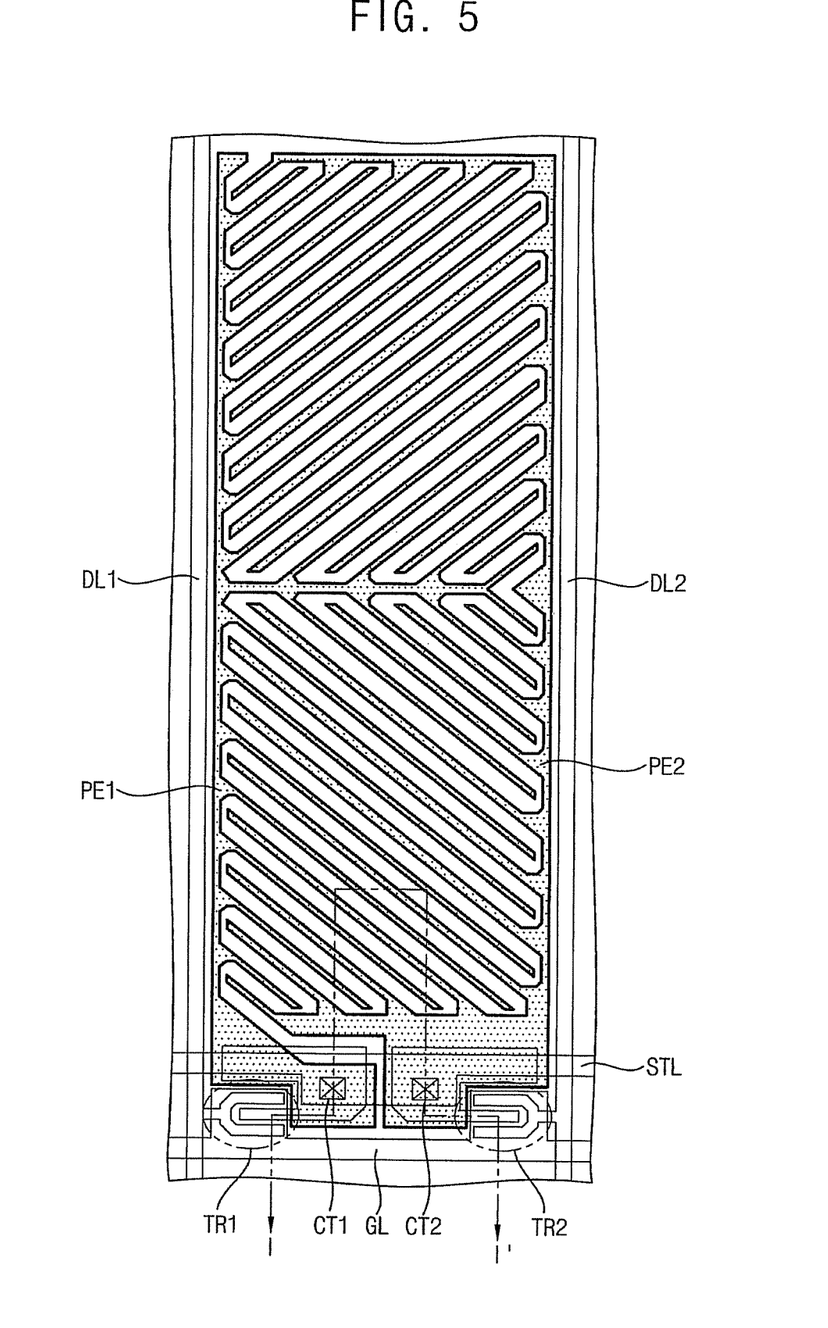
FIG. 5 is a plan view a display panel of the display apparatus according to the exemplary embodiment of the present invention shown in FIG. 1.
Figure 6:
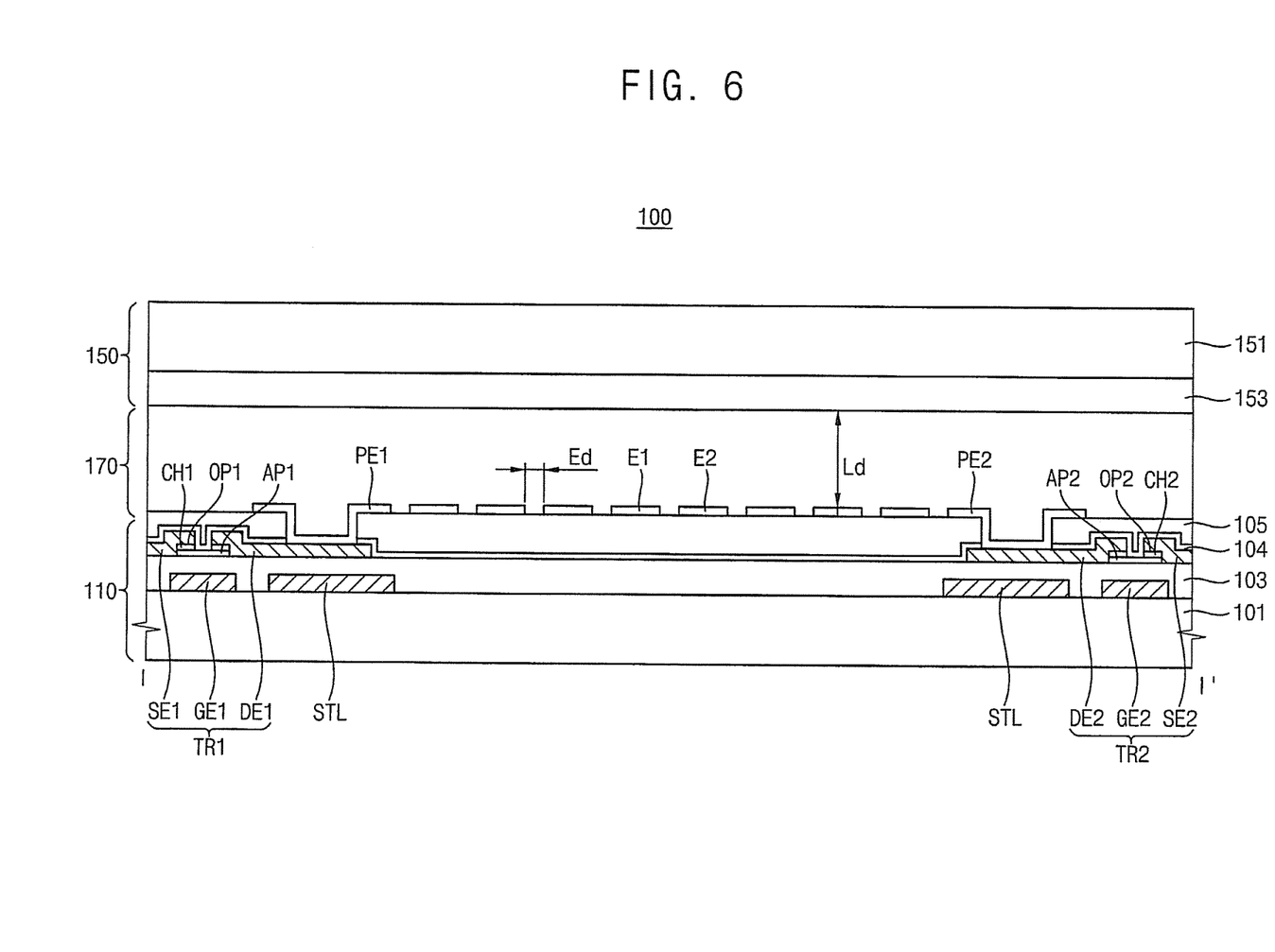
FIG. 6 is a partial cross-sectional view taken along line I-I' of FIG. 5.

FIG. 5 is a plan view of the display panel 100 of the display apparatus according to the exemplary embodiment of the present invention shown in FIG. 1. FIG. 6 is a partial cross-sectional view taken along line I-I' of FIG. 5. The same reference characters in FIGS. 5 and 6 refer to the same or like components as described above with reference to FIGS. 1 and 3, and any repetitive detailed description thereof has hereinafter been omitted.

Referring to FIGS. 5 and 6, the display panel 100 according to an exemplary embodiment includes an array substrate 110, a color filter substrate 150 and a liquid crystal layer 170 interposed between the array substrate 110 and the color filter substrate 150.

The array substrate 110 includes a first base substrate 101 having a plurality of pixel areas thereon. A gate line GL, a first data line DL1, a second data line DL2, a storage line STL, a first switching element TR1, a second switching element TR2, a first pixel electrode PE1 and a second pixel electrode PE2 are formed on the first base substrate 101.

The gate line GL extended along a first direction, e.g., a substantially horizontal or row direction in FIG. 5. The first data line DL1 and the second data line DL2 extend along a second direction substantially perpendicular to and crossing the first direction, e.g., a substantially column or vertical direction in FIG. 5. The storage line STL extends along the first direction, and is formed substantially adjacent and parallel to the gate line GL.

The first switching element TR1 includes a first gate electrode GE1 connected to the gate line GL, a first source electrode SE1 connected to the first data line DL1 and a first drain electrode DE1 electrically connected to the first pixel electrode PE1 through a first contact portion CT1. The second switching element TR2 includes a second gate electrode GE2 connected to the gate line GL, a second source electrode SE2 connected to the second data line DL2 and a second drain electrode DE2 electrically connected to the second pixel electrode PE2 through a second contact portion CT2. The first switching element TR1 includes a first active pattern AP1 and a first ohmic pattern OP1. The first ohmic pattern OP1 is formed between the first source electrode SE1 and the first active pattern AP1 to decrease a contact resistance between the first source electrode SE1 and the first active pattern AP1. In addition, the first ohmic pattern OP1 is formed between the first drain electrode DE1 and the first active pattern AP1 to decrease a contact resistance between the first drain electrode DE1 and the first active pattern AP1. For example, the first active pattern AP1 may include amorphous silicon (a-Si), and the first ohmic patterns OP1 may include n+ amorphous silicon (n+a-Si). In an exemplary embodiment, n+ impurities are implanted into the amorphous silicon layer (a-Si) at a high concentration to form the first ohmic patterns OP1. The second switching element TR2 includes a second active pattern AP2 and a second ohmic pattern OP2. The second ohmic pattern OP2 is formed between the second source electrode SE2 and the second active pattern AP2 to decrease a contact resistance between the second source electrode SE2 and the second active pattern AP2. In addition, the second ohmic pattern OP2 is formed between the second drain electrode DE2 and the second active pattern AP2 to decrease a contact resistance between the second drain electrode DE2 and the second active pattern AP2. For example, the second active pattern AP2 may include amorphous silicon (a-Si), and the second ohmic patterns OP2 may include n+ amorphous silicon (n+a-Si). In an exemplary embodiment, n+ impurities are implanted into the amorphous silicon layer (a-Si) at a high concentration to form the second ohmic patterns OP2.

The first pixel electrode PE1 and the second pixel electrode PE2 are formed in each pixel area of the plurality of pixel areas. The first pixel electrode PE1 has a plurality of first electrode bars E1 and a plurality of second electrode bars E2. In an exemplary embodiment of the present invention, first electrode bars E1 of the plurality of first electrode bars E1, as well as second electrode bars E2 of the plurality of second electrode bars E2 are patterned, as shown in FIG. 5. Further, the second electrode bars E2 are formed between adjacent first electrode bars E1. The first electrode bar E1 receives a data voltage having a first polarity from the first data line DL1 through the first switching element TR1, and the second electrode bar E2 receives a data voltage having a second polarity from the second data line DL2 through the second switching element TR2. Therefore, a horizontal electric field is generated between the first electrode bar E1 and the second electrode bar E2. An alignment of liquid crystal molecules (not shown) of the liquid crystal layer 170 is determined by the horizontal electric field.

In an exemplary embodiment of the present invention, a gap Ed between the first electrode bar E1 and the second electrode bar E2 has a range of approximately 3 μm to approximately 13 μm. In an exemplary embodiment, for example, the gap Ed is less than or equal to approximately 11 μm. Thus, an aperture ratio of the display panel 100 is substantially enhanced.

The array substrate 110 according to an exemplary embodiment may further include a gate insulation layer 103, a protection layer 104 and an organic layer 105. The array substrate 110 may further include a light-blocking layer (not shown) formed on the organic layer 105 proximate to an area where the gate line GL, the first data line DL1, the second data line DL2, the storage line STL, the first switching element TR1 and the second switching element TR2 are formed.

In an exemplary embodiment, the liquid crystal layer 170 includes a positive-type birefringence liquid crystal material (not shown). Further, the liquid crystal layer 170 may be a normally black mode in which a black gray scale is displayed when an electric field is not applied, and in which a white gray scale is displayed when an electric field is applied. Further, liquid crystal molecules of the liquid crystal layer 170 according to an exemplary embodiment of the present invention may be vertically aligned when an electric field is not applied (to thereby block transmission of light therethrough), and the liquid crystal molecules of the liquid crystal layer 170 may be slanted, due to the horizontal electric field, to transmit light therethrough. A cell gap Ld (e.g., a thickness of the liquid crystal layer 170 between the array substrate 110 and the color filter substrate 150) of the liquid crystal layer 170 according to an exemplary embodiment of the present invention may have a range of approximately 2 μm to approximately 6 μm. In an exemplary embodiment of the present invention, for example, the cell gap Ld of the liquid crystal layer 170 is less than or equal to approximately 3.25 μm.

The color filter substrate 150 includes a second base substrate 151. A color filter layer 153 is formed on the second base substrate 151. The color filter layer 153 according to an exemplary embodiment may include a red color filter, a green color filter and/or a blue color filter.

Figure 7:
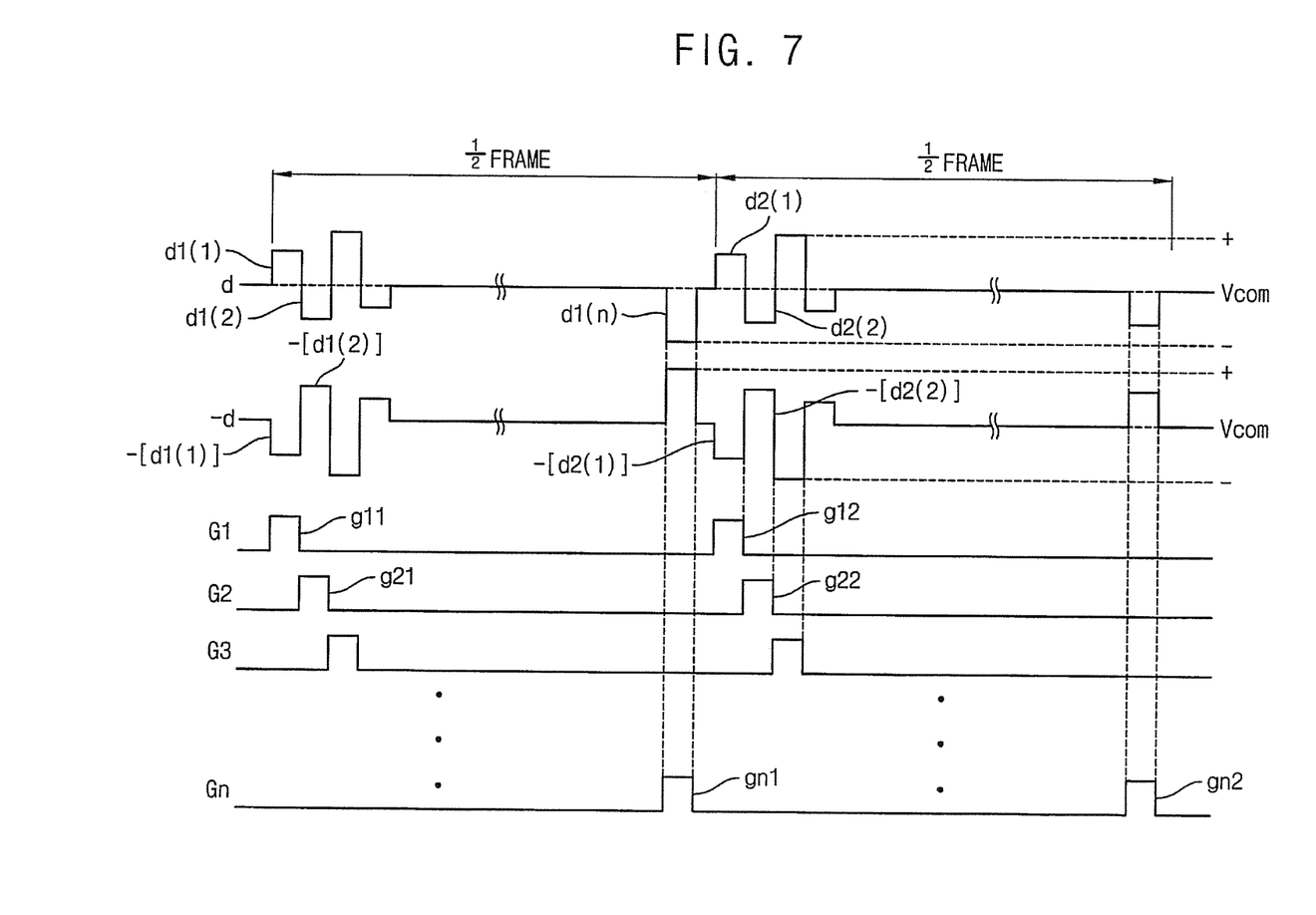
FIG. 7 is a signal timing diagram illustrating driving signals of the display apparatus according to the exemplary embodiment of the present invention shown in FIG. 1.

FIG. 7 is a signal timing diagram illustrating driving signals of the display apparatus according to the exemplary embodiment of the present invention shown in FIG. 1.

Referring to FIGS. 1, 3 and 7, a method of driving the display panel 100 for one frame will be described in further detail. In an exemplary embodiment, the display panel 100 includes m vertical pixel rows and n horizontal pixel rows, wherein m and n are natural numbers. A driving method of an (i)-th vertical pixel row (i being a natural number less than m) connected to the first data line DL1 and the second data line DL2 will now be described.

During a first frame interval, e.g., an early ½ frame interval of one frame interval, the data driving part 250 applies the first data signal d1, to which the first gamma curve γ1 has been applied, to the first data line DL1, and applies a first inverted data signal −d1 having a phase opposite to a phase of the first data signal d1 (relative to a common voltage Vcom) to the second data line DL2. Then, during a second frame interval, e.g., a later ½ frame interval of the one frame interval, the data driving part 250 applies the second data signal d2, to which the second gamma curve γ2 has been applied, to the second data line DL2, and applies the second inverted data signal −d2 having a phase opposite to a phase of the second data signal d2 to the second data line DL2.

The gate driving part 270 sequentially applies a gate signal G having a first gate pulse gn1 and a second gate pulse gn2 to n gate lines during the one frame interval. Thus, the gate driving part 270 applies the first gate pulse g1 to the gate lines during the early ½ frame interval, and applies the second gate pulse g2 to the gate lines during the later ½ frame interval.

For example, during a given early ½ frame interval, the data driving part 250 applies the first data signals d1(1), d1(2), d1(3), . . . , d1(n) corresponding to first through n pixels of the (i)-th vertical pixel row to the first data line DL1, and applies the first inverted data signal −d1(1), −d1(2), −d1(3), . . . , −d1(n) which each have a phase opposite to corresponding phases of each of the first data signals d1(1), d1(2), d1(3), . . . , d1(n) to the second data line DL2.

The gate driving part 270 sequentially applies the first gate pulses g11, g21, g31, . . . , gn1 to the n gate lines during the given early ½ frame interval. During the given early ½ frame interval, the first switching element TR1 and the second switching element TR2 are turned on by the first gate pulse, so that the (i)-th (I being less than m) vertical pixel row displays an image to which the first gamma curve γ1 has been applied.

Then, during a later given ½ frame interval, the data driving part 250 applies the second data signals d2(1), d2(2), d2(3), . . . , d2(n) corresponding to first through n pixels of the (i)-th vertical pixel row to the first data line DL1, and applies the second inverted data signal −d2(1), −d2(2), −d2(3), . . . , −d2(n) each of which has a phase opposite to a corresponding phase of each of the second data signals d2(1), d2(2), d2(3), . . . , d2(n) to the second data line DL2.

The gate driving part 270 sequentially applies the second gate pulses g12, g22, g32, . . . gn2 to the n gate lines during the later given ½ frame interval. During the later given ½ frame interval, the first switching element TR1 and the second switching element TR2 are turned on by the second gate pulse, so that the (i)-th vertical pixel row (i being less than m) displays an image to which the second gamma curve γ2 has been applied.

Therefore, the display panel 100 according to an exemplary embodiment of the present invention is driven by the first data signal d1 and the second data signals d2 to which the first gamma curve γ1 and the second gamma curve γ2, respectively, each optimized for side visibility, have been applied, and viewing angle characteristics of the display panel 100 are thereby substantially enhanced.

Table 1 shows response times and light transmittances in accordance with cell gaps Ld and gaps between electrode bars Ed (best shown in FIG. 6).

TABLE 1

|  | Gap between electrode bars (9 µm) | Gap between electrode bars (11 µm) | Gap between electrode bars (13 µm) |
| --- | --- | --- | --- |
| Cell gap (3.0 µm) | 4 ms to 5 ms | 6 ms to 8 ms | 7 ms to 9 ms |
| Cell gap (3.25 µm) | 4.5 ms to 5.5 ms | 6.7 ms to 8.7 ms | 8 ms to 10 ms |
| Cell gap (3.5 µm) | 5 ms to 6 ms | 7.5 ms to 9.5 ms | 9 ms to 11 ms |
| Transmittance | 126% | 132% | 136% |

Referring to Table 1, when a gap between electrode bars Ed is no more than approximately 11 µm and a cell gap is no more than approximately 3.25 µm, a response time is no more than approximately 8 ms. Therefore, when a driving frequency of one frame is about 60 Hz, a ½ frame interval is about 8.3 ms, and the pixel P displays a gray scale during ½ frame interval.

When a gap Ed between the electrode bars is no more than approximately 11 µm and a cell gap is no more than about approximately 3.25 µm, light transmittance may have a value no less than approximately 132%, with respect to a super patterned vertical alignment ("SPVA") mode display apparatus. Therefore, as the dual polarity driving method according to an exemplary embodiment of the present invention described herein is employed in an LCD apparatus, the cell gap Ld may be decreased to effectively enhance light transmittance.

Thus, according to exemplary embodiments of the present invention as described herein, a first data signal having a dual polarity and to which a first gamma curve has been applied, is applied to a pixel during an early ½ frame interval, and a second data signal having a dual polarity and to which a second gamma curve has been applied, is applied to the pixel during a later ½ frame interval. As a result, a side visibility of an LCD apparatus according to an exemplary embodiment is substantially enhanced. Moreover, a required cell gap is substantially decreased in the LCD apparatus using the dual polarity driving method, and a response time and light transmittance of the LCD apparatus according to an exemplary embodiment are thereby substantially enhanced.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method of driving a display panel comprising a first switching element connected to a first data line and a gate line, a second switching element connected to the gate line and to a second data line adjacent to the first data line, and a liquid crystal capacitor connected to an output terminal of each of the first switching element and the second switching element, the method comprising: applying a first data signal to which a first gamma curve has been applied to the first data line and a first inverted data signal having a phase opposite to a phase of the first data signal to the second data line during a first frame interval; and applying a second data signal to which a second gamma curve has been applied to the first data line and a second inverted data signal having a phase opposite to a phase of the second data signal to the second data line during a second frame interval temporally subsequent to the first frame interval, wherein the first frame interval is a first half of one frame and the second frame interval is a second half of the one frame; wherein the first data line and the second data line are connected to the same pixel.

2. The method of claim 1, further comprising:
applying a first gate pulse to the gate line during the first frame interval; and
applying a second gate pulse to the gate line during the second frame interval.

3. A display apparatus comprising: a display panel comprising: a first switching element connected to a first data line and a gate line; a second switching element connected to the gate line and a second data line adjacent to the first data line; wherein the first data line and the second data line are connected to the same pixel; and a liquid crystal capacitor connected to an output terminal of each of the first switching element and the second switching element; a data driving part which applies a first data signal to which a first gamma curve has been applied to the first data line and a first inverted data signal having a phase opposite to a phase of the first data signal to the second data line, during a first frame interval, and which applies a second data signal to which a second gamma curve has been applied to the first data line and a second inverted data signal having a phase opposite to a phase of the second data signal to the second data line, during a second frame interval temporally subsequent to the first frame interval; and a gate driving part which applies a gate signal to the gate line, wherein the first frame interval is a first half of one frame, and the second frame interval is a second half of the one frame.

4. The display apparatus of claim 3, wherein the gate signal comprises:
a first gate pulse applied to the gate line during the first frame interval; and
a second gate pulse applied to the gate line during the second frame interval.

5. The display apparatus of claim 3, further comprising a pixel connected to the first data line and the second data line, wherein the pixel comprises:
a first storage capacitor formed by a drain electrode of the first switching element, a storage line and an insulation layer disposed between the drain electrode of the first switching element and the storage line; and
a second storage capacitor formed by a drain electrode of the second switching element, the storage line and an insulation layer disposed between the drain electrode of the second switching element and the storage line.

6. The display apparatus of claim 5, further comprising a gamma voltage generating part which stores data corresponding to the first gamma curve and the second gamma curve and which generates a first gamma data and a second gamma data, to which the first gamma curve and the second gamma curve, respectively, have been applied, based on image data corresponding to an image to be displayed on the pixel.

7. The display apparatus of claim 6, wherein
the data driving part converts the first gamma data and the second gamma data into the first data signal and the second data signal, respectively, and
the first data signal and the second data signal comprise an analog signal.

8. The display apparatus of claim 3, wherein the display panel further comprises:
an array substrate including a first pixel electrode connected to an output terminal of the first switching element and a second pixel electrode connected to an output terminal of the second switching element in a pixel area having a pixel formed thereon;
a color filter substrate disposed above the array substrate and having a color filter layer formed thereon; and
a liquid crystal layer interposed between the array substrate and the color filter substrate.

9. The display apparatus of claim 8, wherein
the first pixel electrode and the second pixel electrode each include a plurality of first electrode bars and a plurality of second electrode bars, and
second electrode bars of the plurality of second electrode bars are formed between adjacent first electrode bars of the plurality of first electrode bars.

10. The display apparatus of claim 9, wherein the plurality of first electrode bars and the plurality of second electrode bars are formed on a same plane.

11. The display apparatus of claim 10, wherein a distance, measured in the plane, between a given first electrode bar and an associated adjacent second electrode bar is in a range from approximately 3 µm to approximately 13 µm.

12. The display apparatus of claim 8, wherein the liquid crystal layer comprises a positive-type birefringence liquid crystal material.

13. The display apparatus of claim 12, wherein a cell gap of the liquid crystal layer is in a range from approximately 2 µm to approximately 6 µm.

14. A display apparatus comprising: a display panel comprising: a first switching element connected to a first data line and a gate line; a second switching element connected to the gate line and a second data line adjacent to the first data line; wherein the first data line and the second data line are connected to the same pixel; and a liquid crystal capacitor connected to an output terminal of each of the first switching element and the second switching element; a pixel connected to the first data line and the second data line, the pixel comprising: a first storage capacitor formed by a drain electrode of the first switching element, a storage line and an insulation layer disposed between the drain electrode of the first switching element and the storage line; and a second storage capacitor formed by a drain electrode of the second switching element, a the storage line and an insulation layer disposed between the drain electrode of the second switching element and the storage line; a data driving part which applies a first data signal to which a first gamma curve has been applied to the first data line and a first inverted data signal having a phase opposite to a phase of the first data signal to the second data line, during a first half of one frame, and which applies a second data signal to which a second gamma curve has been applied to the first data line and a second inverted data signal having a phase opposite to a phase of the second data signal to the second data line, during a second half of the one frame temporally subsequent to the first half of the one frame; and a gate driving part which applies a first gate pulse to the gate line during the first half of the one frame and a second gate pulse to the gate line during the second half of the one frame.

15. The display apparatus of claim 14, wherein the display panel further comprises:
an array substrate including a first pixel electrode connected to an output terminal of the first switching element and a second pixel electrode connected to an output terminal of the second switching element in a pixel area having the pixel formed thereon;
a color filter substrate disposed above the array substrate and having a color filter layer formed thereon; and
a liquid crystal layer interposed between the array substrate and the color filter substrate, wherein
the liquid crystal layer comprises a positive-type birefringence liquid crystal material, and
a cell gap of the liquid crystal layer is in a range from approximately 2 µm to approximately 6 µm.

16. The display apparatus of claim 15, wherein
the first pixel electrode and the second pixel electrode each include a plurality of first electrode bars and a plurality of second electrode bars,
the second electrode bars are formed between adjacent the first electrode bars, and
a distance between a given first electrode bar and an associated adjacent second electrode bar is in a range from approximately 3 µm to approximately 13 µm.

* * * * *